Patented Apr. 30, 1929.

1,711,449

UNITED STATES PATENT OFFICE.

ORIN D. CUNNINGHAM, OF INDIANAPOLIS, INDIANA, ASSIGNOR TO PETER C. REILLY, OF INDIANAPOLIS, INDIANA.

TREATMENT OF PITCH.

No Drawing.  Application filed April 27, 1925. Serial No. 26,302.

The present invention relates to the treatment of pitchy material, with sulfuric acid and heat, under conditions to produce the sulfonation thereof and while permitting action of sulfuric acid upon the entire amount of the said pitchy material, without undesirable gumming up of the material at any stage.

The invention also embraces the products, first a decolorizing material and subsequently (if desired) a material having some of the properties of carbon black (suitable as a filler in rubber or suitable as a pigment).

This invention in one form has to do with new and useful improvements in the manufacture of decolorizers of which the following is a specification.

The present invention relates to the preparation and production of a decolorizing agent, from pitches of mineral (organic), animal or vegetable origin by treating the same with strong sulphuric acid and preferably heating.

The use of strong sulphuric acid in prior art of making decolorizers has been limited solely to its dehydration action on carbohydrates to yield carbon of a form that is highly active as a decolorizer. Its reaction with hydrocarbons, however, is distinctly different.

Since pitches consist essentially of complex aromatic hydrocarbons, the action of sulphuric acid is not one of dehydration, as in the case of carbohydrates, but sulphonation, sulphurization, oxidation and other possible reactions, which result in the transformation of the pitches into substances which are adapted for use in some of the arts in which decolorizing agents are employed.

The nature of the decolorizing action of my product distinguishes it from all decolorizing agents heretofore known in that an acid (sulphurous and probably sulphuric acid) is liberated during the process of decolorizing. This acid is not present in the carbon as free acid, but is liberated from some sort of chemical (or possibly physical) combination by the process of decolorizing. That its liberation is distinctly associated with the process of decolorizing can be demonstrated by comparing the acidity imparted to a glucose solution which has been and which has not been previously decolorized by a decolorizing agent which imparts no acidity to the glucose solution, other conditions being the same.

It is well known that merely the acidulation of an undecolorized glucose solution produces an observable decolorizing effect. The decolorizing power of my product, however, is decidedly more than the effect of the free acid which it adds to the glucose solution. After the decolorizing is complete, the acid may be neutralized without effecting the decolorizing, except to the slight extent attributable to the free acid itself.

The following examples are given for illustration, without limiting myself thereto.

*Example 1.*—The invention is carried out on coal tar pitch as a specific example as follows: One part of hard coal tar pitch (m. p. about 150° C.) preferably wet-ground to a fine state of division, is added slowly to about five parts by weight of strong sulphuric acid while being vigorously agitated. The mixture is then slowly stirred while being heated to 160–170° C., or thereabout, being kept at this temperature until the reaction is complete, after which the reaction mixture is cooled to 100° C., and run slowly into about ten times its volume of cold water while being stirred. The product is washed free of acid preferably by decantation with water and dried.

The reaction is regarded as complete when all the hydrocarbons are sulfonated, and no further amounts of hydrocarbon, as such, can be found in the product. When using 95% acid, this may require an hour at 160–170° C.

A particular sample of the product from Example 1, after washing, was found to contain about 13% of sulfur, it was neutral to water (i. e. did not render the water acid) but was found to neutralize or partially neutralize, alkali solution. It has the valuable property, as above stated, of decolorizing glucose solutions, and if the glucose solutions are initially neutral, they become slightly acidified by such treatment. In other words, one of the products of the decolorizing reaction is an acid, probably including sulfuric acid.

After use, this decolorizing material can be revivified (several times), by boiling with water and then with dilute hydrochloric acid.

*Example 2.*—If it is desired to produce a substance to be used as a substitute for carbon black (e. g. as a pigment or a filler for rubber compositions), the sulfonation mixture obtained by treating powdered pitch with strong sulfuric acid and heat (as in Example 1) should be freed substantially of free sulfuric acid by washing by decantation with water, after which the product should be treated with an alkali solution (preferably hot) to destroy any free sulfuric acid and to neutralize the potential acidity of the sulfonated pitch product. It is preferable to use a slight excess of alkali over that required for neutralization, and the excess neutralized after the alkali treatment with acid. Thus the product of Example 1 can be treated with hot alkali solution (soda or ammonia being suitable) and then preferably again well washed with water and dried.

Throughout the process, all the washing treatments are preferably done by the decantation method.

It is to be noted that the alkali treatment of the sulfonated pitch destroys its decolorizing properties, but produces a neutral product adaptable for use as a carbon black substitute.

The product of the sulfonation, after treatment with water, is a black, water-insoluble, impalpably fine powder. It is also substantially insoluble in the common organic solvents (e. g. benzene and acetone), also in acid solutions and alkaline solutions.

When the material is heated it will decompose, giving off sulfur dioxide, the temperature necessary for this depending on the kind of pitch used and perhaps the degree of sulfonation. Thus one sample commenced to decompose at around 300° C. The material also readily oxidizes by action of the air, when heated to between 150 and 200° C.

I claim:—

1. A sulfonated pitch having decolorizing properties.

2. A new decolorizing agent consisting of complex organic sulphur compounds which when added to a non-alkaline colored glucose solution produces a liberation of acid in conjunction with the decolorization.

3. A carbonaceous material which has decolorizing properties, which on treatment with alkali, loses said decolorizing properties.

4. A carbonaceous material which has decolorizing properties which on treatment with alkali, loses said decolorizing properties, and which material, when so treated with alkali is useful as a pigment or filler for rubber.

5. A process for making a decolorizing agent from pitch which comprises treating pitch with more than its own weight of strong sulphuric acid and heating to a temperature of about 160 to 170° C.

6. A process which comprises reducing solid pitch to a fine condition, mixing with sulfuric acid and heating.

7. A process which comprises reducing pitch to a fine condition, mixing with sulfuric acid and heating until substantially the entire amount of hydrocarbons present, has been converted into other materials.

8. A process which comprises reducing pitch to a fine condition, mixing with sulfuric acid and heating until sulfonation is substantially complete.

9. A process which comprises reducing pitch to a fine condition mixing with a substantial excess of sulfuric acid and heating.

10. A process which comprises reducing pitch to a fine condition, mixing with about five times its weight of sulfuric acid and heating.

11. That process of treating pitchy material for the production of a substance suitable for use as a decolorizing agent, and which after treatment with alkali is suitable for use as a filler or pigment, which comprises admixing pitchy material in the solid state with sulphuric acid, heating the admixture until reaction between such ingredients is complete, and finally washing the same.

12. That process of treating pitchy material for the production of a substance suitable for use as a decolorizing agent, which comprises admixing pitchy material with sulphuric acid, agitating the mixture and heating the admixture until the hydrocarbons of the pitch are substantially completely transformed into other substances.

13. That process of treating pitchy material for the production of a substance for use as a decolorizing agent, which comprises admixing pitchy material with sulphuric acid and heating the admixture until the hydrocarbons of the pitch are substantially completely transformed into other substances, and thereafter cooling and washing the same.

14. That process of treating pitchy material for the production of a substance suitable for use as a decolorizing agent and which can be converted into a filler or pigment, which comprises admixing pitchy material with sulphuric acid and agitating the mixture; then heating the admixture until substantially all of the hydrocarbons are reacted upon, cooling the same and running the same into a relatively large body of water; removing the mass from the water and finally washing the same.

15. That process of treating pitchy material which consists in admixing pitchy material in the solid state with sulphuric acid and agitating the mixture, then heating the admixture to about 160-170° C., cooling the same and running it into water; removing the mass from the water; thereafter removing the free acid from the product.

16. A completely sulfonated hard pitch.

17. A black completely sulfonated pitch.

In testimony whereof I have signed my name to this specification.

ORIN D. CUNNINGHAM.